(12) United States Patent
Popov et al.

(10) Patent No.: US 8,465,858 B2
(45) Date of Patent: Jun. 18, 2013

(54) DEVELOPMENT OF A NOVEL METHOD FOR PREPARATION OF PEMFC ELECTRODES

(75) Inventors: Branko N. Popov, Columbia, SC (US); Hansung Kim, Seoul (KR)

(73) Assignee: University of South Carolina, Columbia, SC (US)

( * ) Notice: Subject to any disclaimer, the term of this patent is extended or adjusted under 35 U.S.C. 154(b) by 2611 days.

(21) Appl. No.: 11/191,605

(22) Filed: Jul. 28, 2005

(65) Prior Publication Data

US 2006/0040157 A1 Feb. 23, 2006

Related U.S. Application Data

(60) Provisional application No. 60/591,685, filed on Jul. 28, 2004.

(51) Int. Cl.
*H01M 8/02* (2006.01)
*H01M 4/86* (2006.01)
*H01M 4/88* (2006.01)
*H01M 4/96* (2006.01)

(52) U.S. Cl.
USPC .............. 429/40; 429/523; 429/530; 429/535

(58) Field of Classification Search
None
See application file for complete search history.

(56) References Cited

U.S. PATENT DOCUMENTS

| | | | |
|---|---|---|---|
| 6,080,504 A | 6/2000 | Taylor et al. | |
| 6,379,827 B1 * | 4/2002 | Cipollini | 429/13 |
| 2002/0034676 A1 * | 3/2002 | Kim et al. | 429/44 |
| 2003/0027035 A1 | 2/2003 | Datz et al. | |
| 2004/0157110 A1 * | 8/2004 | Knights et al. | 429/44 |
| 2005/0014050 A1 | 1/2005 | Punsalan et al. | |
| 2005/0074651 A1 | 4/2005 | Kidai et al. | |
| 2005/0095487 A1 | 5/2005 | Hamrock et al. | |
| 2005/0100778 A1 | 5/2005 | Shimizu et al. | |

OTHER PUBLICATIONS

Preparation of PEM fuel cell electrodes using pulse electrodeposition by Hansung Kim, Nalini P. Subramanian, Branko N. Popov, Journal of Power Sources, vol. 138 pp. 14-24, published 2004.

* cited by examiner

*Primary Examiner* — Ula C. Ruddock
*Assistant Examiner* — A. Echelmeyer
(74) *Attorney, Agent, or Firm* — Dority & Manning, P.A.

(57) ABSTRACT

A method based on pulse electrodeposition technique was developed for preparation of membrane electrode assemblies (MEAs). In this approach, platinum is deposited directly on the surface of the carbon electrode. The method ensures most of the platinum to be in close contact with the membrane. Using this method it is possible to increase the Pt/C ratio up to 75 wt % near the surface of the electrode resulting in a 5 μm thick catalyst layer. The MEA prepared by pulse electrodeposition exhibits a current density of 0.33 A/cm$^2$ at 0.8 V with platinum loading of 0.25 mg of Pt/cm$^2$. The results indicate that pulse deposition may be an attractive technique to replace the conventional powder-type MEA preparation methods and help achieve industry goals of reducing catalyst cost and increasing efficiency in polymer electrode membrane fuel cells (PEMFCs).

9 Claims, 20 Drawing Sheets

DEVELOPMENT OF A NOVEL METHOD FOR PREPARATION OF PEMFC ELECTRODES

RELATED APPLICATIONS

The present application claims priority to U.S. Application Ser. No. 60/591,685 filed on Jul. 28, 2004.

FIELD

The present invention relates to a multi-layer polymer electrolyte membrane, and the development of a membrane electrode assembly (MEA) for proton exchange membrane fuel cells.

BACKGROUND

Polymer Electrolyte Membrane (PEM) fuel cells offer low weight and high power density and are being considered for automotive and stationary power applications. Current approaches for preparing a membrane electrode assembly (MEA) for PEM fuel cells can be broadly divided into two different categories: powder type and non-powder type. The powder type involves the process of catalyzation on a high surface area of carbon. The prepared carbon supported catalyst is mixed with binder and then applied to the membrane followed by gas diffusion layer (GDL) addition or to the GDL followed by membrane addition. A colloid mixture containing Pt/C powder, perfluorosulfonate ionomers (PFSI, such as Nafion) and solvent using ultrasonic treatment is prepared. This paste was then spread over the wet proofed gas diffusion layer of carbon paper. The electrodes with the paste on it were hot-pressed to both sides of a membrane to fabricate MEA. The observed increase in MEA performance was attributed to the increase in contact area between the PFSI and the Pt particles.

A catalyst decaling process in order to produce a dense and thin catalyst layer has also been developed. The first step in this process is preparing ink containing Pt/C powder, Nafion solution and solvent. This ink is then applied to a Teflon blank and heated until dry. More layers of Pt/C/Nafion ink are added until the desired catalyst loading is achieved. The catalyst coated Teflon blanks are hot pressed to the Nafion membrane. Then the Teflon blank is peeled away from the membrane, resulting in the MEA.

The catalyst layer in powder type MEA has a uniform concentration profile of the catalyst, since the Pt/C powder is thoroughly mixed with the binder before being applied to the membrane or GDL. A high content of Pt in the Pt/C powder allows reducing the thickness of the catalyst layer without sacrificing the catalyst loading per area of electrode. However, it is difficult to control the particle size of the catalyst when the Pt to carbon ratio increases more than 40 wt %.

In order to overcome this limitation, several non-powder type processes were developed. These processes create the catalyst directly on the surface of carbon electrode or membrane. A two-step impregnation-reduction method has been previously described. The Nafion membrane first undergoes an ion exchange reaction with a metal salt. Next, the impregnated membrane is exposed to a reducing agent to form a catalyst layer directly on the membrane. Another method is evaporative deposition, in which a Pt salt is evaporated and deposited on a membrane. A third MEA preparation technique is sputtering in which a very thin layer of sputter deposited platinum on a wet-proofed GDL performs very similarly to a standard E-TEK electrode. However, this technique is not a volume production method. It requires expensive vacuum equipment and cannot be used for fabrication of large structures with complex shapes.

A non-powder type electrodeposition technique has attracted attention due to its ease of preparation and low cost requirement. An electrochemical catalyzation (ECC) technique has been demonstrated to improve the utilization of Pt catalyst. In this technique platinum ions are diffused through a thin Nafion layer and electrodeposited only in regions of ionic and electronic conductivity. This post-catalyzation process can avert the loss of active Pt site by PTFE binder coverage. However, this process is strongly limited by diffusion of Pt complex ion across the Nafion layer. To avoid this limitation, carbon has been impregnated with $H_2PtCl_6$ and applied an electrochemical pulsed current to deposit Pt in the Nafion active layer. This process guarantees a smaller active layer thickness and high platinum mass fraction up to 40 wt. %. However, in terms of Pt concentration distribution, it has a profile like that of a powder type process, and Cl— ions produced from electrodeposition of Pt from $H_2PtCl_6$ remain in the active layer. The Cl— ions are known to poison platinum and reduce the catalytic activity of platinum. There is currently no technique to replace conventional powder type MEA preparation methods that will help achieve industry goals of reducing the cost and increasing the efficiency of polymer electrode membrane fuel cells.

Therefore, a polymer electrode membrane fuel cell that is capable of being produced at a reduced cost and has an increased operating efficiency is desirable.

SUMMARY

The present disclosure recognizes and addresses the foregoing needs, and others in the field of fuel cells.

The present disclosure is directed toward a polymer electrolyte membrane fuel cell. The fuel cell has a membrane electrode assembly that has a surface area. The catalyst layer has a thickness of less than 15 µm and contains catalytic metal.

In certain embodiments, the catalytic metal is Pt. In some embodiments, the catalyst layer has a thickness ranging from 4 µm to 12 µm. In some embodiments, the catalytic metal to carbon ratio of the catalyst layer is at least 25 wt. % within less than 6 µm of the surface area. In other embodiments, the catalytic metal to carbon ratio of said catalyst layer is at least 50 wt. % within less than 4 µm of the surface area. In yet another embodiments, the catalytic metal to carbon ratio of said catalyst layer is at least 75 wt. % within less than 2 µm of the surface area. In still other embodiments, the catalytic metal to carbon ratio of the catalyst layer is at least 75 wt. % within less than 2 µm of the surface area and the catalytic metal to carbon ratio of the catalyst layer is less than 5 wt. % within greater than 7 µm of the surface area.

In another exemplary embodiment, a method of making a polymer electrolyte membrane fuel cell is disclosed. In this method, an uncatalyzed carbon electrode having a surface area is provided. The uncatalyzed carbon electrode is contacted with an electrodeposition solution containing ions of catalytic metal and a pulse current is applied to deposit the catalytic metal on the surface area of the carbon electrode thereby forming a catalyst layer.

BRIEF DESCRIPTION OF THE DRAWINGS

A full and enabling disclosure of the present invention, including the best mode thereof to one of ordinary skill in the art, is set forth more particularly in the remainder of the specification, including reference to the accompanying figures in which.

DETAILED DESCRIPTION

Figure 1:
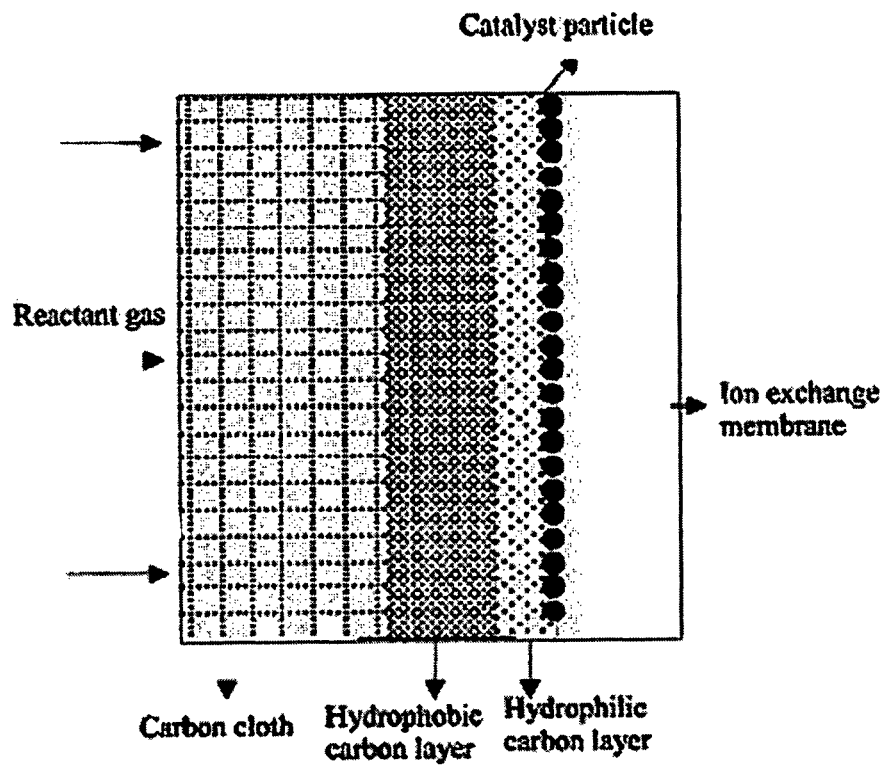
FIG. 1: Schematic diagram of the electrode prepared by pulse electrodeposition.

It is to be understood by one of ordinary skill in the art that the present discussion is a description of exemplary embodiments only, and is not intended as limiting the broader aspects of the present invention, which broader aspects are embodied in the exemplary construction.

In general, the present disclosure is directed to a polymer electrolyte membrane (PEM) fuel cell. As would be well known in the art, fuel cells are electrochemical cells which produce usable electricity by the catalyzed combination of a fuel such as hydrogen and an oxidant such as oxygen. PEM may be used in the fabrication of membrane electrode assemblies (MEA's) for use in fuel cells. A MEA is the central element of a proton exchange membrane fuel cell. The PEM fuel cell described herein is capable of being produced at a reduced cost and has an increased operating efficiency. It has been determined that performance of the catalyst layer can be optimized by controlling pulse deposition parameters.

In particular, the present disclosure is directed to a new approach involving pulse electrodeposition as an attractive technique to replace conventional carbon type MEA preparation methods. Performance of the catalyst layer is optimized by controlling pulse deposition parameters such as peak current density, duty cycle, and total charge density. The peak current density and the pulse duty cycle have been found to control nucleation rate and decrease catalyst dendric growth. It has also been found that the amount of platinum loading can be controlled by the total charge density.

To localize the metal catalyst at the membrane interface, it is important to prepare a proper uncatalyzed carbon blank electrode. In some embodiments, this can be accomplished by applying a hydrophobic material to form a hydrophobic material layer on one side of a hydrophobic carbon cloth. Other suitable substrate materials may also be utilized in accordance with the present disclosure. A suitable hydrophobic material is a hydrophobic organic material, particularly a nonionic polymer compound. For example, in some embodiments, a perfluorocarbon polymer such as PTFE can be used. The hydrophobic material is mixed with carbon to form a paste. Various carbon sources as would be known in the art may be utilized. Examples of carbon ingredients include carbon black, graphite material and carbon material, or metals or half-metals. Carbon blacks such as channel black, thermal black, furnace black, acetylene black and the like are preferable as such carbon ingredients in terms of the electron conductivity and the specific surface area. Once prepared, the paste may be applied and rolled on the hydrophobic carbon cloth. The resulting substrate has a very strong hydrophobic nature.

Subsequently, an organic solvent as would be known in the art may be added to the hydrophobic carbon layer. In some embodiments, glycerol may be utilized as a suitable organic solvent. The resulting uncatalyzed carbon blank electrode has a very thin hydrophilic surface due to the addition of the organic solvent.

Next, a catalyst layer is applied to the uncatalyzed carbon blank electrode. In accordance with this disclosure, deposition of a catalytic metal or alloy as small particles is favored by conducting the electrolytic deposition on a cathodic substrate using a pulsed electric field with short on-time/off-time and/or short duty cycle. A pulse generator may be utilized to control both the pulse wave and the deposition current density. However, other methods as would be known in the art may also be utilized. The current densities, the duty cycle, and the charge density may be adjusted in accordance with the present invention to optimize the deposition rates. The pulse current density is typically from about 20 mA/cm$^2$ to about 600 mA/cm$^2$ while the duty cycle is typically from about 1% to about 35%. The ratio of catalytic metal to carbon in the catalyst layer is at least 25 wt. % within less than 8 μm to 75 wt. % within less than 2 μm of said surface area. In some embodiments, the catalytic metal to carbon ratio of the catalyst layer is less than 5 wt. % within greater than 7 μm of said surface area.

In some embodiments, after electrodeposition the electrode is heated to remove the solvent contained in the hydrophilic layer. Next, the electrode is heat treated and the electro-catalyzed electrode is then impregnated with Nafion solution or another ion conductor as would be known in the art. Heat treatment may be accomplished at varying temperatures as would be known in the art.

EXAMPLES

Preparation of Uncatalyzed Carbon Electrode:

To localize Pt at the membrane carbon interface it is critical to prepare a proper carbon blank electrode. This was done through the following steps. Carbon black (Vulcan Xc-72, Cabot Corp.) was treated at 600° C. for 3 h to remove organic matter. Next, the pretreated carbon was thoroughly mixed with well-defined masses of PTFE solution (60 wt %) and isopropyl alcohol were in a supersonic bath. The prepared paste is applied and rolled onto a hydrophobic carbon cloth and annealed at 300° C. in air. The resulting substrate has a strong hydrophobic nature. Subsequently, an organic solvent is added to the above mixture, which is then homogenized using ultrasound for 30 min. This ink is applied on the hydrophobic carbon layer prepared in the first step. The resulting blank carbon electrode has a hydrophilic surface due to the addition of the organic solvent.

Electrodeposition Process:

The electrodeposition of platinum was performed on the carbon blank electrode using a Pt plating bath containing 10 g/L of $H_2PtCl_6$ and 60 g/L of HCl at room temperature. The blank carbon electrode was loaded on the sample holder coupled with a copper plate as a current collector. The electrodeposited size of the electrode was varied from 5 to 25 cm$^2$ by adjusting the window size of the sample holder exposed to the electrolyte. Platinum gauze was used as an anode. A pulse generator controlled both the pulse wave and the deposition current density. The current densities, the duty cycle and the charge density were changed to optimize the deposition rate.

MEA Fabrication Process:

After electrodeposition, the electrodes were heated at 300° C. in air to remove the solvent contained in the hydrophilic carbon layer. In the second step, the electrodes were heat treated in $H_2$ at 300° C. for 2 hrs. After the heat treatment, the electro-catalyzed electrode was impregnated with 5 wt % of Nafion solution by spraying and then dried at 80° C. for 2 hours. The amount of Nafion loading was controlled to 0.8 mg/cm$^2$. The commercial ETEK electrode (20 wt % Pt/C, 0.4 mg/cm$^2$) was used as the anode for all tests in order to eliminate experimental error originating from anode preparation. A total of 1.2 mg/cm$^2$ Nafion solution was applied to E-TEK anode electrodes by brushing and spraying. The Nafion-impregnated electrodes and the membrane (Nafion 112) were bonded to form a MEA by hot pressing at 130° C. for 3 min. at a pressure of 140 atm. The reaction gases were supplied through a humidifier and a mass flow controller from hydrogen and oxygen tanks. The reactant gases flowed according to the cell performance (1.5/2 stoics for $H_2$ and $O_2$). The cell was operated under ambient pressure.

Characterization of the Electrode:

Cyclic voltammetry was used to determine the Pt effective surface area. The experiment was performed in 0.5 M $H_2SO_4$ at 25° C. saturated with nitrogen using a conventional three-electrode cell. Saturated $Hg/Hg_2SO_4$ equilibrium served as a reference electrode. Electron probe microanalysis (EPMA, Cameca instrument incorporated, model MBX) was used to measure the thickness of the electrocatalyst layer across the cross-sectioned MEA. The particle size of the Pt prepared by pulse electrodeposition was determined using Transmission Electron Microscopy (TEM, Hitachi H-8000 model). Energy dispersive analysis by X-ray (EDAX) coupled with environment scanning electron microscopy (ESEM) was used to obtain the surface morphology of the electrode and to determine the Pt/C ratio on the surface of the carbon electrode. The amount of platinum electrodeposited on the electrode was estimated by using ICP-AES (Perkin Elmer 400) analysis.

Results and Discussion

FIG. 1 illustrates the structure of the MEA prepared by a pulse electrodeposition technique. The deposition was carried out on uncatalyzed carbon substrate. The substrate consisted of a hydrophobic carbon cloth and a carbon paste layer placed on top of the carbon cloth. This whole layer acted as a gas diffusion layer (GDL) in a conventional electrode. In the modified electrode a hydrophilic carbon layer was added to the substrate for reasons explained below.

During electrodeposition, the thickness of the catalyst layer is controlled by the electrolyte penetration into the uncatalyzed carbon electrode. Since this phenomenon depends on the hydrophilic nature of the carbon electrode in case of an excessive hydrophilic nature of the layer, the electrolyte penetrates deeply into the carbon support and the resulting catalyst layer is thicker than desired. A strong hydrophobic layer results in a deposition within a very narrow layer thereby leading to a formation of dendrites. Thus, the optimized surface properties of the carbon support would lead to a desired particle size while reducing the catalyst layer thickness. To examine the exact structure of MEA, EPMA and energy dispersive X-ray (EDX) spot analysis were performed.

Figure 2:
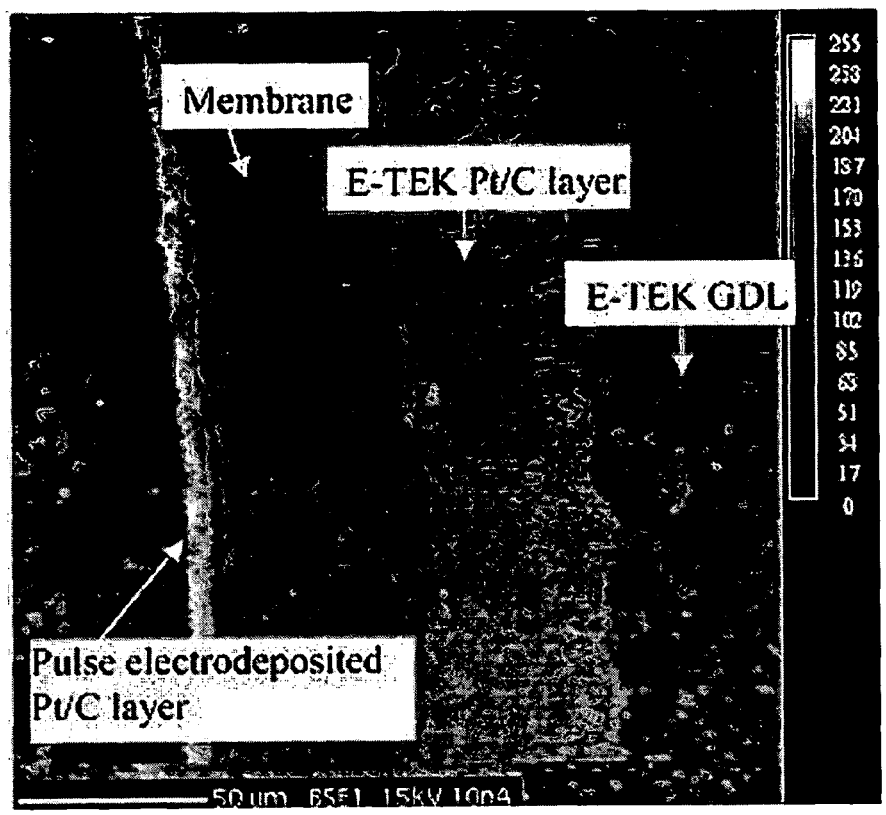
FIG. 2: Backscattered electron image of the cross section of the membrane and electrode assembly.
Figure 3:
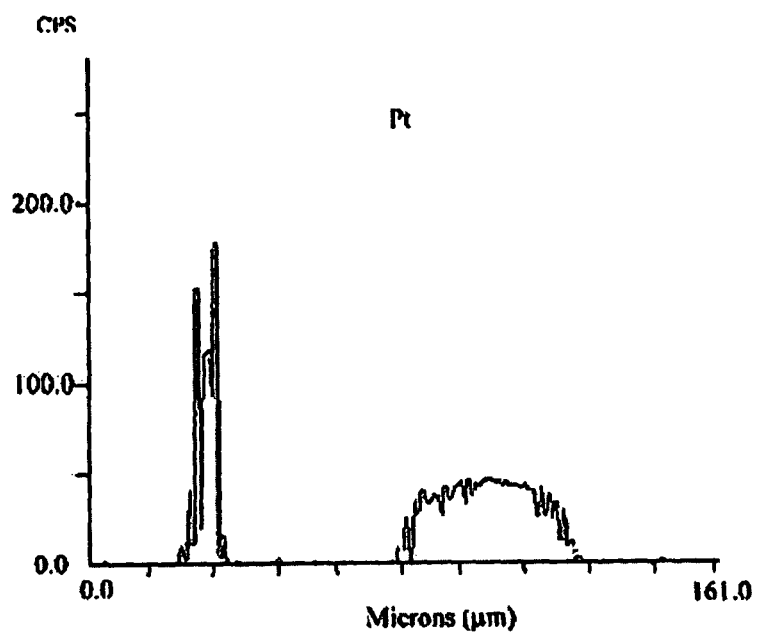
FIG. 3: Platinum profile of the cross section of the membrane and electrode assembly in FIG. 2.

FIG. 2 displays the backscattered electron image of the cross section of MEA consisting of an E-TEK anode and pulse deposited cathode. This image shows the five layers clearly and is useful for identifying the thickness of the membrane, catalyst layer, and gas diffusion electrode regions. The thickness of the Nafion 112 membrane is confirmed to be 50 µm according to the scaling bar given in the bottom of the picture. The bright portion between the membrane and gas diffusion layer is associated with the presence of a heavier element such as Pt. Thus, these two light-colored bands on either side of the membrane show the thickness of the electrocatalyst layer on the anode and cathode side. The most striking aspect of this image is that the thickness of the pulse electrodeposited Pt electrocatalyst layer is only 5 µm, which is ten times thinner than that of the E-TEK electrode. This is also confirmed from the concentration profile of Pt measured across a typical portion of the cross section of MEA by line scan using EPMA as shown in FIG. 3. It is useful here to distinguish between the two different approaches used to prepare the anode and cathode. The E-TEK anode was prepared using the conventional powder type approach where Pt/C mixture is dispersed and then loaded on the gas diffusion layer by spraying or coating. The cathode was prepared by the pulse electrodeposition approach by plating Pt on the blank carbon electrode and subsequently attaching it to the Nafion membrane.

Figure 4:
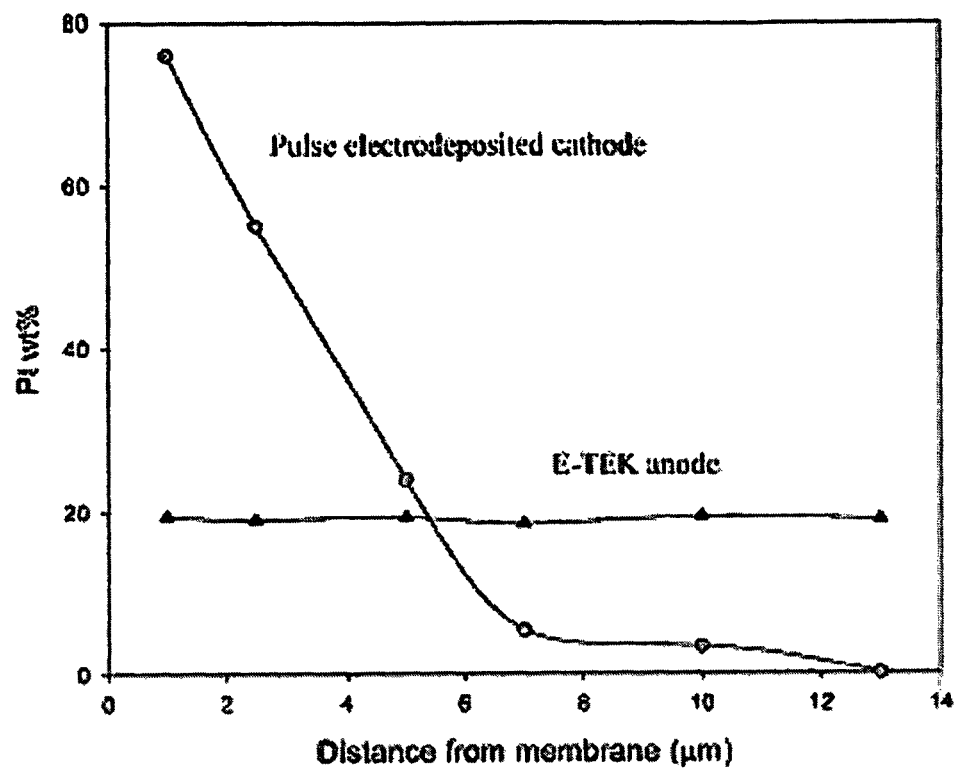
FIG. 4: The concentration distribution of Pt in the electrocatalyst layer of E-TEK anode and pulse electrodeposited cathode with a distance from the membrane.

In FIG. 3, the pulse electrodeposited cathode exhibits a much higher intensity of Pt peak in the limited area near the membrane while the Pt line scan across the E-TEK anode electrode shows a relatively uniform intensity with a thickness of 50 µm. Since the EPMA line profile has a broad resolution, to quantify the Pt ratio in the catalyst layer, the EDX spot analysis coupled with ESEM was also carried out for this cross section of the MEA. The results are shown in FIG. 4. According to this analysis, the Pt content in the cathode catalyst layer prepared by pulse electrodeposition decays with increasing distance from the membrane to the GDL. The Pt-to-carbon ratio at 1 µm distance from the membrane is about 75 wt % and this value reduces to almost zero at a distance of 7 μm from the membrane. In contrast, the E-TEK electrode shows about 20 wt % of Pt/C ratio distributed uniformly over the entire range of the catalyst layer. Both experimental and modeling studies of membrane electrodes indicate that active layers thicker than 10 μm result in low catalyst utilization due to transport limitations of dissolved oxygen and protons in the ionomer.

Figure 5:
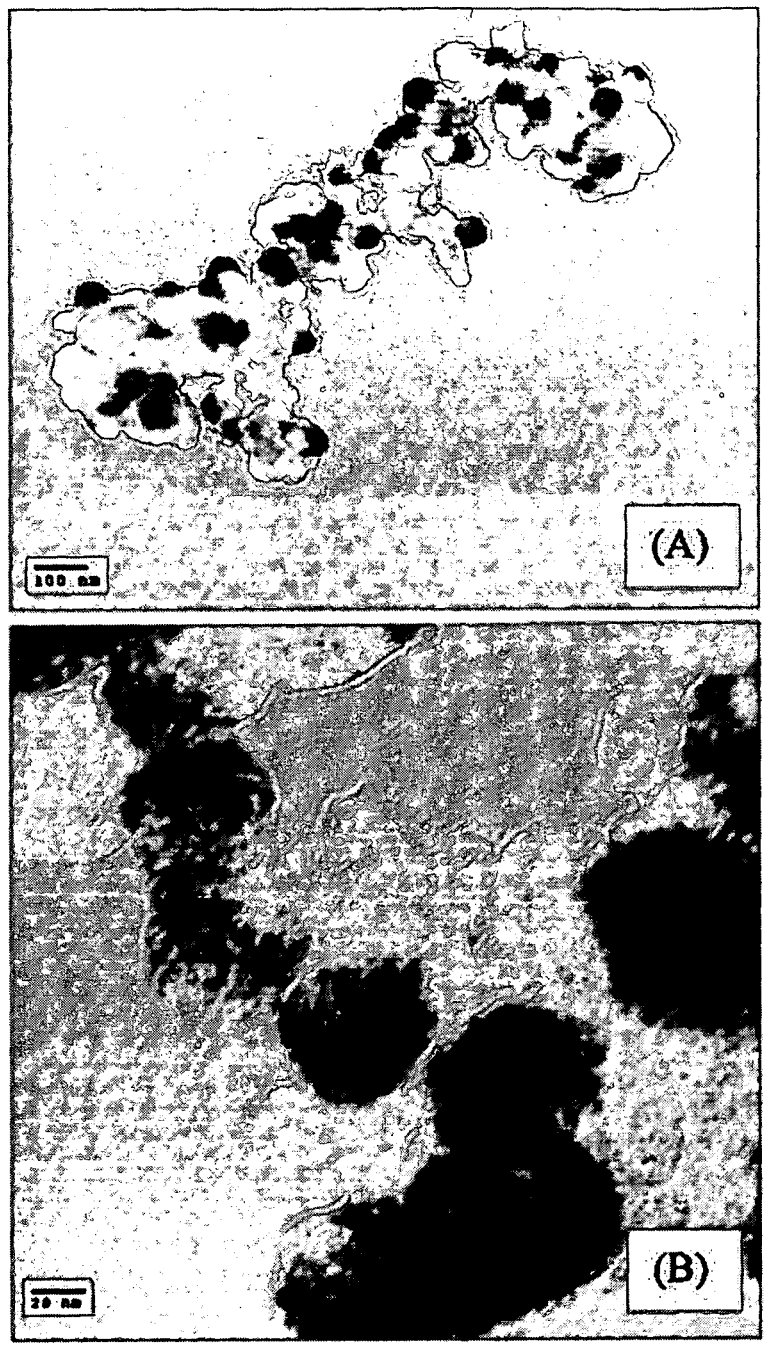
FIG. 5: TEM image of Pt supported on carbon prepared by pulse electrodeposition, (A) 100000 magnitude (B) 400000 magnitude.

FIG. 5 shows a typical TEM image of catalyst prepared by pulse electrodeposition. From the low magnitude TEM image noted as A, the dark spot indicates the presence of platinum. A scaling bar of 100 nm is given in the bottom of the image. According to this data, the particle size of carbon is 60-70 nm and the particle size of platinum seems to be a somewhat smaller. So it is a reasonable guess that a much smaller particle of platinum deposits on the surface of carbon and, for this reason, both particle sizes look similar. Next, the magnitude of TEM was increased to 400000. This TEM image (FIG. 4B) shows that the previously observed large dark particles (FIG. 4A) consist of smaller particles in rage of 3-4 nm. Also as shown in this figure, platinum exists in isolated places. Because only one side of carbon is exposed to the electrolyte, the platinum is deposited only on the exposed side of the particle. Therefore, Pt metal particles exist very close to the surface of the electrode and a thinner catalyst layer was obtained using the pulse electrodeposition approach.

Figure 6:
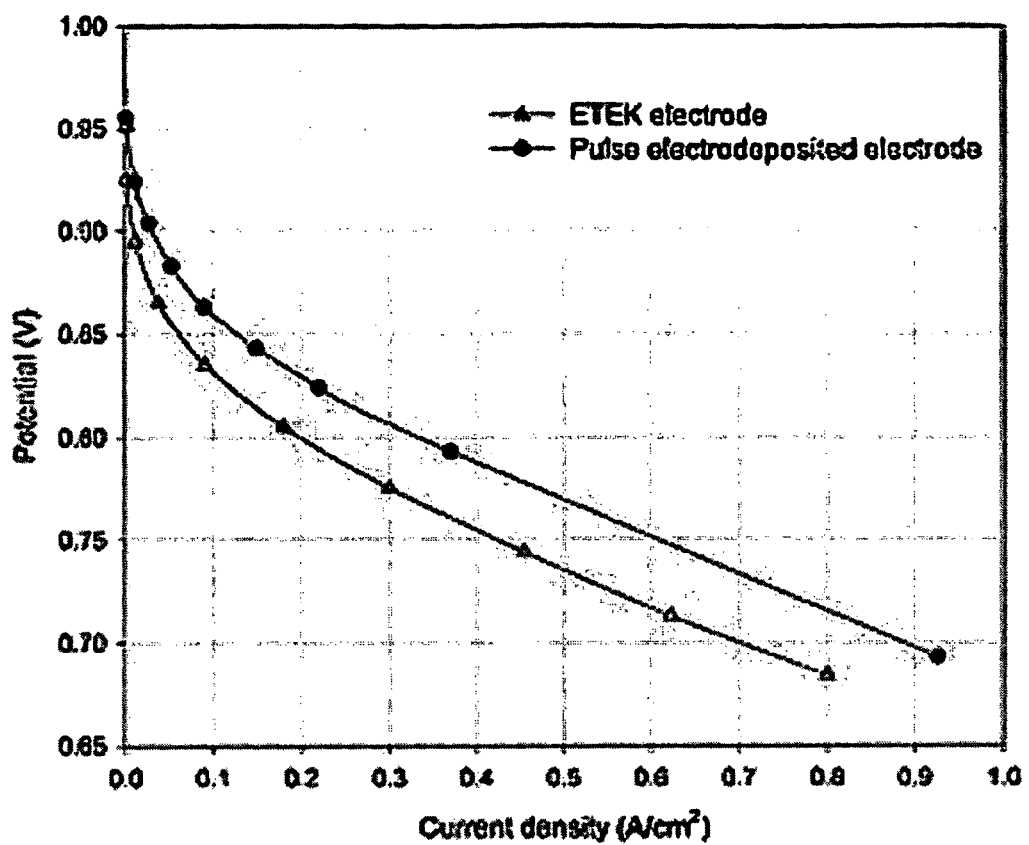
FIG. 6: Comparison of MEA performance between pulse electrodeposited electrode and E-TEK electrode, $H_2/O_2$, 75° C., 1 atm.

FIG. 6 shows the performance of a PEMFC using two different types of cathode, one prepared using our selective deposition method and the other prepared using a conventional Pt/C powder-type method. The peak current density was optimized to be 200 mA/cm$^2$, on time 5 ms, off time 102.8 ms, and total charge density 11 C/cm$^2$. The results indicate that this method enables a selective deposition of Pt which leads to higher current densities at a given potential. For example, our electrode generates 0.33 A/cm$^2$ current density at 0.8 V, whereas the commercial E-TEK electrode gives only 0.2 A/cm$^2$ under the same conditions. Further, the pulse electrodeposited electrode uses only 62% of Pt used in the conventional electrode. The enhanced performance results from the improved electrode structure prepared by the pulse electrodeposition.

In an electroplating process, metal ions are transferred to the cathode and adatoms are formed by the charge transfer reaction and finally incorporated into the crystal lattice. This phenomenon occurs by building up existing crystals (growth of crystals) or creating new ones (nucleation). These two steps are in competition and can be influenced by the surface diffusion rate of adatom and the rate of charge transfer reaction. High surface diffusion rates, low population of adatoms caused by slow charge transfer reaction and low overpotential lead to the growth of crystals; conversely, low surface diffusion rates, high population of adatoms, and high overpotential increase the rate of nucleation. The nucleation rate is given by $$J = K_1 \exp\left[\frac{-bs\varepsilon^2}{zekT\eta}\right] \quad [1]$$

where $K_1$ is the rate constant, b is the geometric factor depending on the shape of the 2D cluster (b=P$^2$/4S, where P is the perimeter and S is the surface area), s is the area occupied by one atom on the surface of the nucleus, $\varepsilon$ is the edge energy, k is the Boltzmann constant, z is the electronic charge of the ion, e is the charge of the electron, and T is the temperature. The overpotential, η, is given by the Tafel expression, $$\eta = \alpha + \beta \log i \quad [2]$$

where α and β are constants and i is the current density. From the above equations it can be seen that as the applied current density increases the overpotential increases, which in turn according to Eq. 1 increases the nucleation rate.

Figure 7:
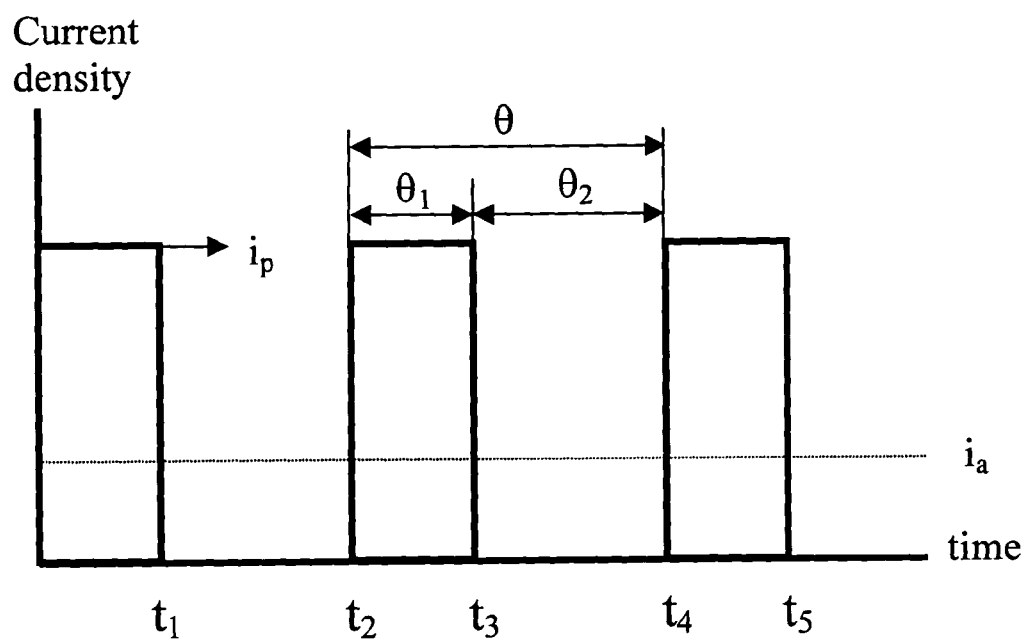
FIG. 7: Current waveform and pulse deposition parameters.

When compared to direct current (DC) deposition, pulse electrodeposition enables higher cathodic current density to be applied at the electrode interface due to the higher concentration of metal ions at the surface of electrode. A simple diffusion model was suggested in earlier research to interpret theoretically the pulse and DC deposition processes. The current wave form of pulse deposition is shown in FIG. 7. Pulse electrodeposition has three independent variables, namely, on time ($\theta_1$), off time ($\theta_2$) and peak current density ($i_p$). The duty cycle is defined as follows.

$$\text{Duty cycle } (\%) = \frac{\theta_1}{\theta_1 + \theta_2} \times 100 \quad [3]$$

Figure 8:
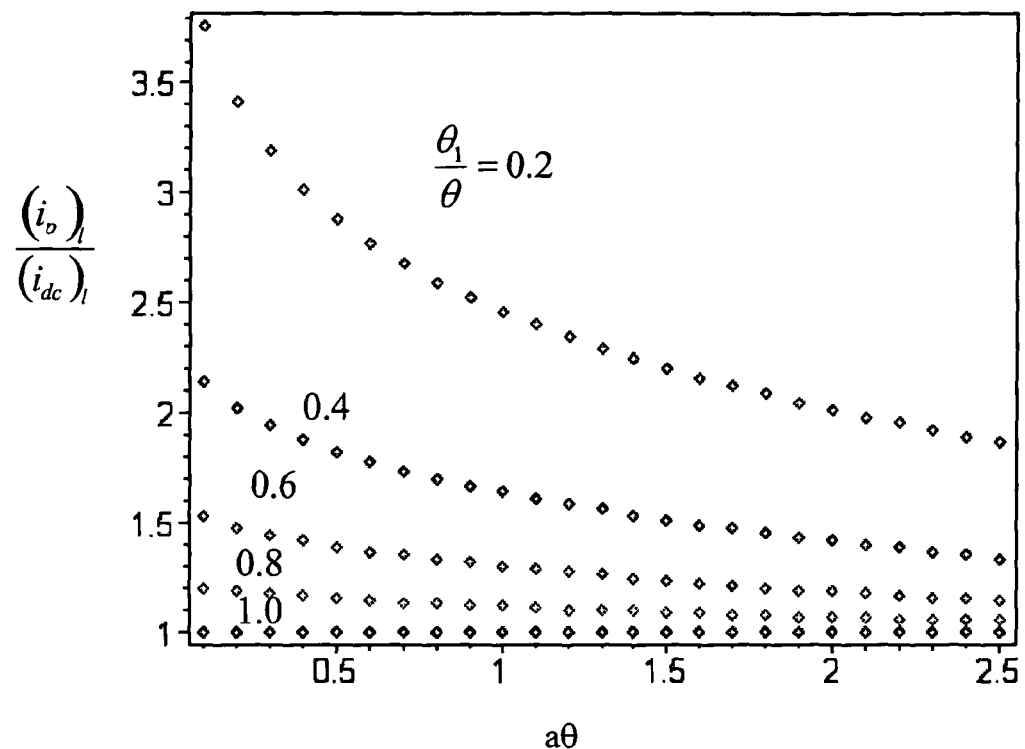
FIG. 8: The ratio of limiting current density between pulse electrodeposition and direct current electrodeposition with respect to pulse period and duty cycle.

The ratio of the limiting current density in pulse electrodeposition $(i_p)_l$ and DC plating $(i_{dc})_l$ was determined by Cheh and is given below.

$$\frac{(i_p)_l}{(i_{dc})_l} = \frac{1}{1 - \frac{8}{\pi^2}\sum_{j=1}^{\infty}\frac{1}{(2j-1)^2}\cdot\frac{(\exp[(2j-1)^2 a\theta_2]-1)}{(\exp[(2j-1)^2 a\theta]-1)}} \quad [4]$$

where a=π$^2$D/4δ$^2$ (sec$^{-1}$) is the diffusion parameter. This ratio for various values of aθ (pulse period) and $\theta_1/\theta$ (duty cycle) is plotted in FIG. 8. The result shows that the limiting current density of pulse electrodeposition is always higher than that of DC electrodeposition. Moreover, the electrodeposition can be carried out at a higher current density by decreasing the pulse periods or by decreasing the duty cycle. According to Eq. 2, the larger the current density, the higher the overpotential is. Thus, the nucleation rate increases, resulting in a finer crystal grain.

Figure 9:
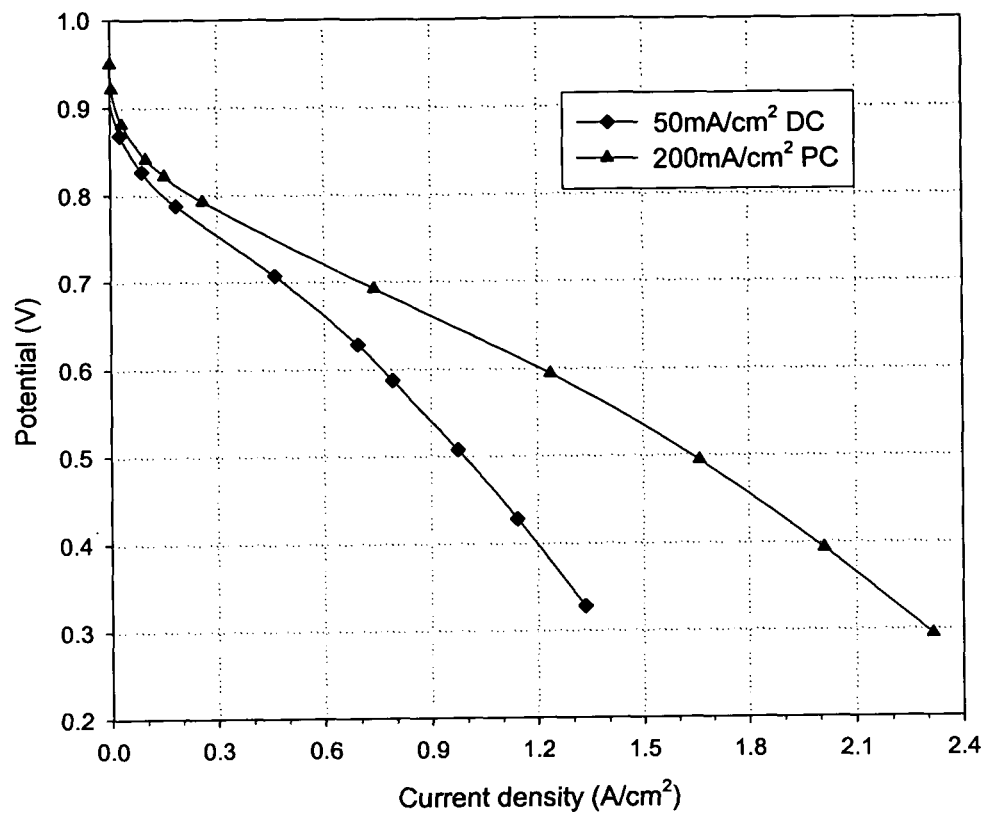
FIG. 9: Polarization curves of MEAs prepared by direct current and pulse electrodeposition.

FIG. 9 shows the polarization curves of the PEM fuel cell prepared by DC and pulse current (PC) electrodeposition of Pt. The pulse electrodeposited electrode was prepared under the conditions of 200 mA/cm$^2$ of peak current density, 5.2 ms on time and 70 ms off time. The current density of 50 mA/cm$^2$ was applied continuously for DC electrodeposition. Total charge density was fixed at 6 C/cm$^2$ in both cases. The results clearly show the advantage of pulse electrodeposition. The MEA prepared by pulse electrodeposition at higher current density exhibits better performance than does the MEA prepared by direct current deposition at lower current density. The observed difference in the MEA performance can be explained by taking into account different Pt particle sizes of the electrodes prepared using DC and PC deposition techniques.

Figure 10:
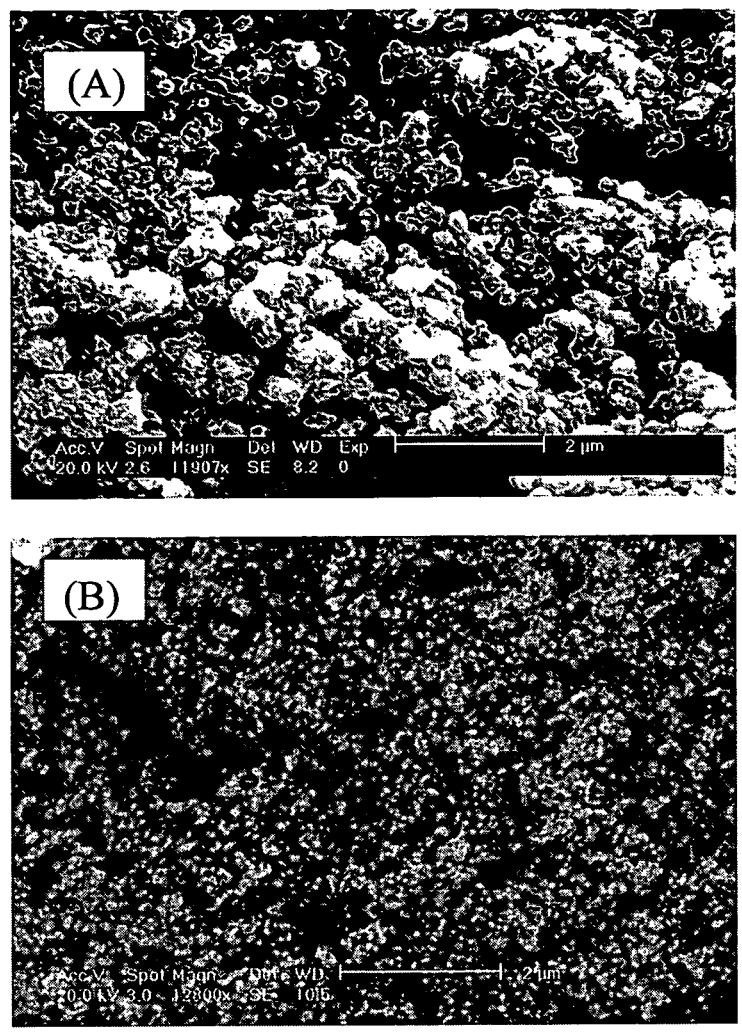
FIG. 10: SEM images of Pt electrodeposited electrodes (A) 50 mA/cm$^2$ of DC electrodeposition (B) 200 mA/cm$^2$ of peak current density, 5.2 ms on time and 70 ms off time. The total charge is fixed at 6 C/cm$^2$ in both cases.

FIG. 10 presents SEM images of electrodes prepared using DC and PC deposition techniques. The grain size of the Pt deposited at 50 mA/cm$^2$ by DC deposition is larger than that of the Pt prepared at 200 mA/cm$^2$ by PC deposition. By increasing the current density for pulse electrodeposition, the deposition overpotential is also increased, resulting in an increase in the rate of nucleus formation. In the case of PC deposition, metal ions diffuse into the surface of the electrode during the off time so that it is possible for the electrodeposition to be performed at higher peak current density. DC deposition continuously consumes metal ions without any relaxation time. Consequently, the current density reaches the point where the concentration of the metal ions is insufficient even at lower current density and enormous growth of platinum occurs, decreasing the effective surface area of Pt, which explains the observed decrease in the MEA performance.

Figure 11:
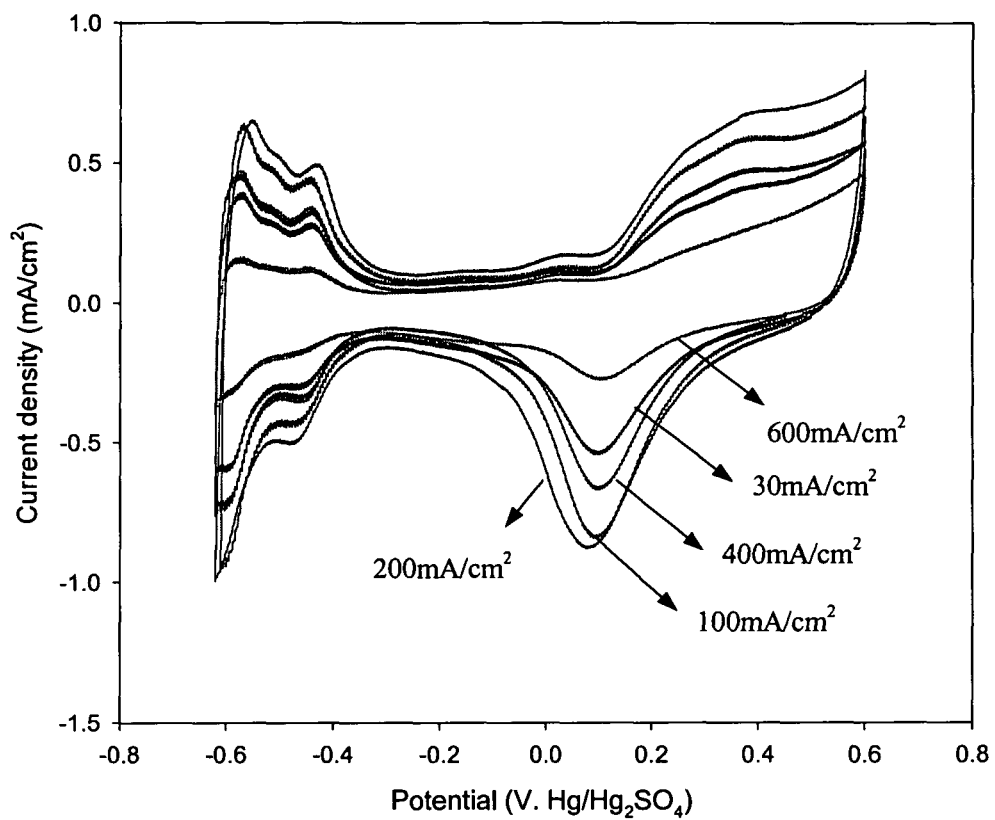
FIG. 11: Cyclic voltammograms of the electrodes prepared at different peak current densities in pulse electrodeposition. Total charge density is fixed at 6 C/cm$^2$.

The effect of peak current density in PC mode on Pt electrodeposition was studied by supplying a constant number of Pt atoms to the carbon surface. In this experiment, the peak current density was varied while keeping both the average current density and the number of coulombs per pulse constant. FIG. 11 shows cyclic voltammograms of electrodeposited electrodes prepared at different peak current densities. The CVs were performed in 0.5 M $H_2SO_4$ saturated with $N_2$ at scan rate of 5 mV/s. The effective surface area of Pt was calculated from the area of hydrogen desorption peak between −0.62 and −0.25 V vs. $Hg/Hg_2SO_4$ after subtracting the contribution of the double layer charge. This area is converted into the effective active surface area of Pt using the factor of 210 $\mu C/cm^2$.

The pulse condition, specific surface area and wt % of Pt on the surface of the electrode, measured by EDX, are summarized in Table 1. It is clear from this data that the peak current density does affect the active surface area of the Pt due to changes in Pt grain size. With increase in peak current density, the effective surface area of Pt also increases, indicating that smaller particles of Pt are deposited. However, the effective surface area shows a dramatic decrease when a peak current density of 600 $mA/cm^2$ is used to deposit Pt. At this high current density, hydrogen evolution reaction occurs at a very high rate and destroys the surface of the electrode. As a result, the Pt wt %, measured by EDX, decreases from 55 wt % to 26 wt %.

Figure 12:
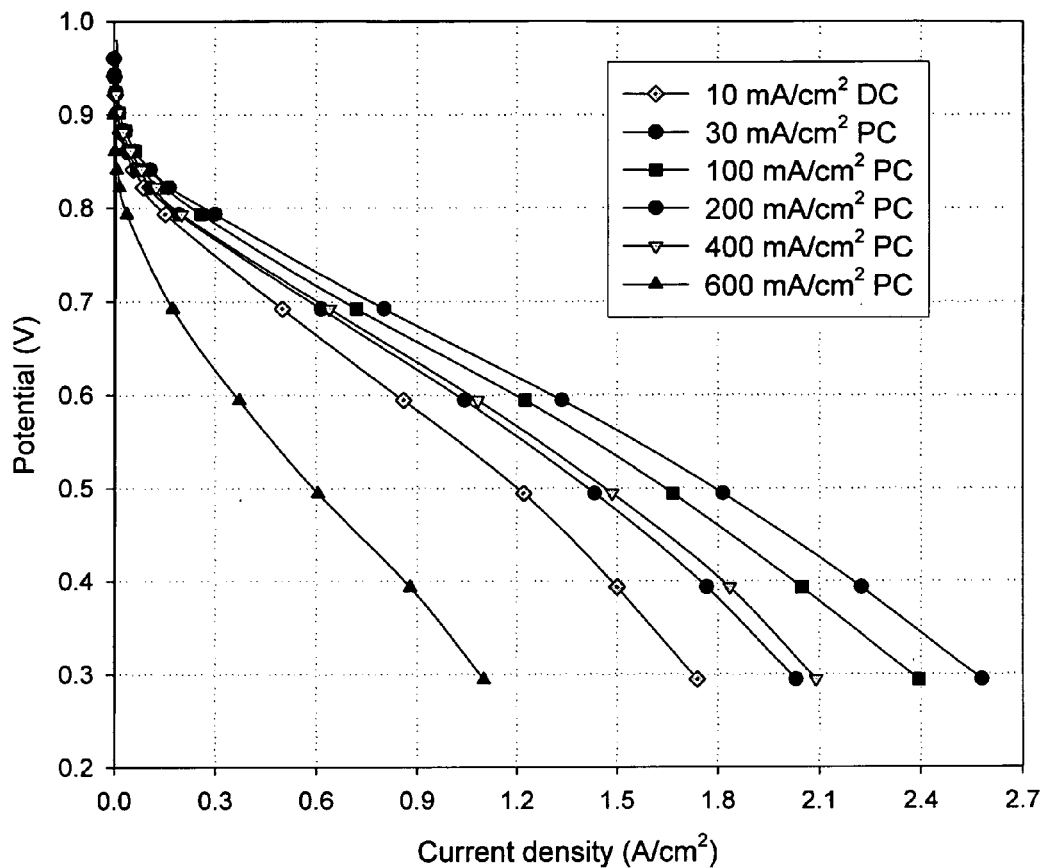
FIG. 12: Effect of the peak current density of pulse electrodeposition on the performance of the PEM fuel cell.

The polarization curves for MEAs prepared by using different current densities are shown in FIG. 12. The electrodes prepared at peak current density of 200 $mA/cm^2$ show better performance than those deposited at lower current density in both DC and PC mode. The increase in performance is contributed to the increase in both, the active surface area of platinum and platinum loading in the catalyst layer. As expected, the electrode prepared using very high current density (600 $mA/cm^2$) has the lowest performance, which accords with the observation made from cyclic voltammetry.

Figure 13:
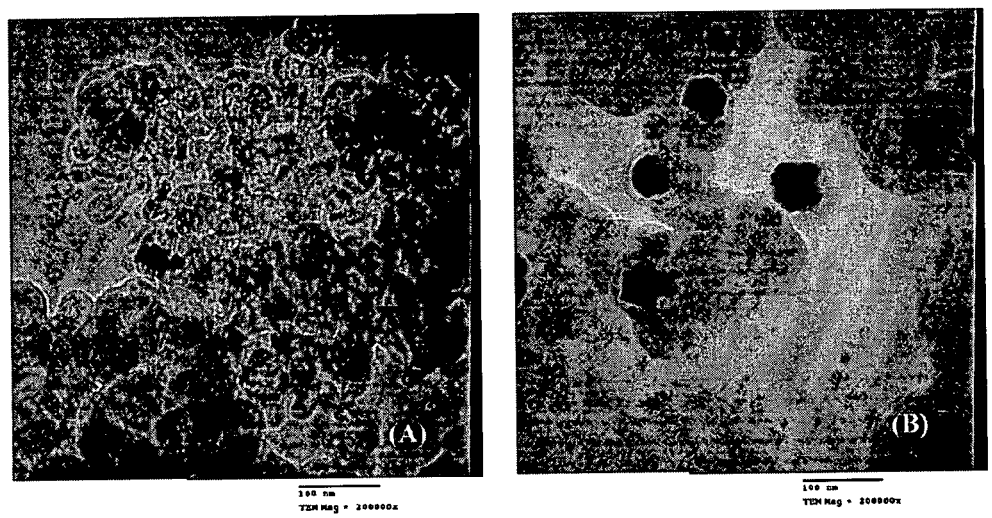
FIG. 13: TEM images of Pt deposited on carbon under different electrodeposition conditions (A) 200 mA/cm$^2$ of PC, (B) 10 mA/cm$^2$ of DC.

The TEM images presented in FIG. 13 show the effect of current density on Pt particle size. When the current density 10 $mA/cm^2$ is used for deposition, the particles aggregate, resulting in formation of large particles. When the peak current density is increased to 200 $mA/cm^2$, the particle size of the deposit becomes smaller, indicating that the nucleation rate has increased.

Figure 14:
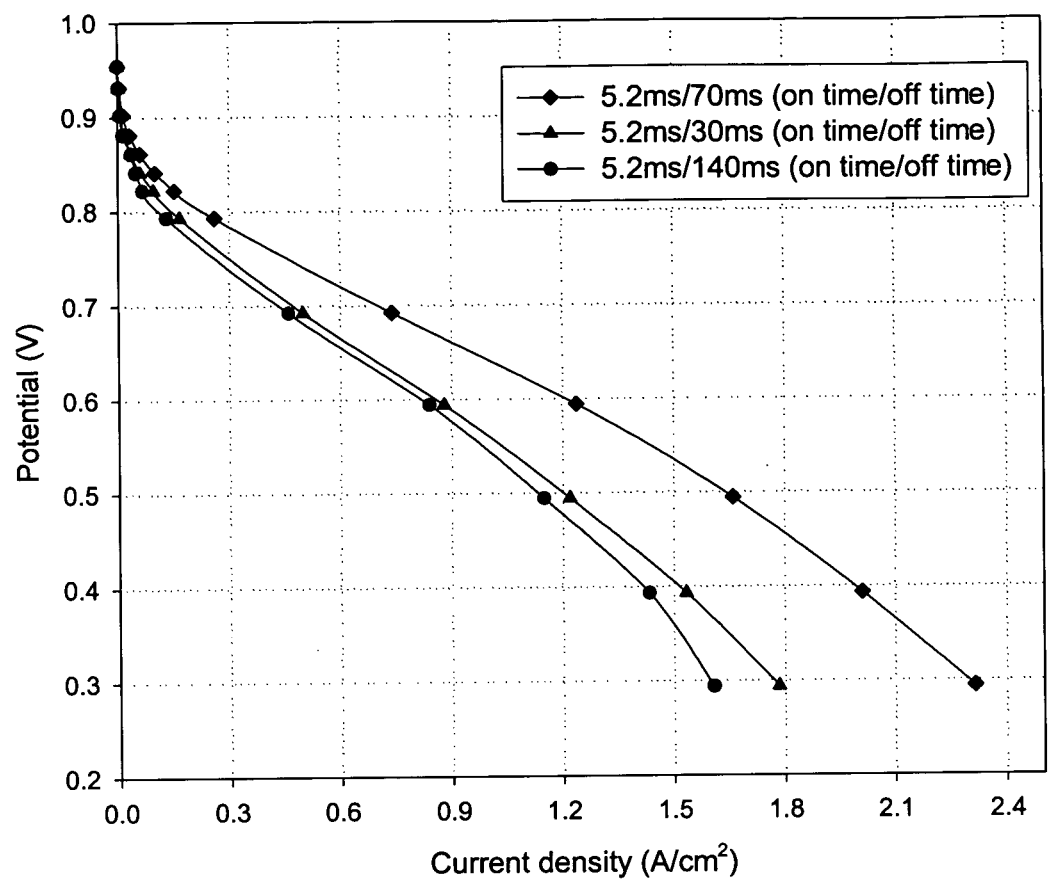
FIG. 14: Polarization curves of MEA prepared at different duty cycles.
Figure 15:
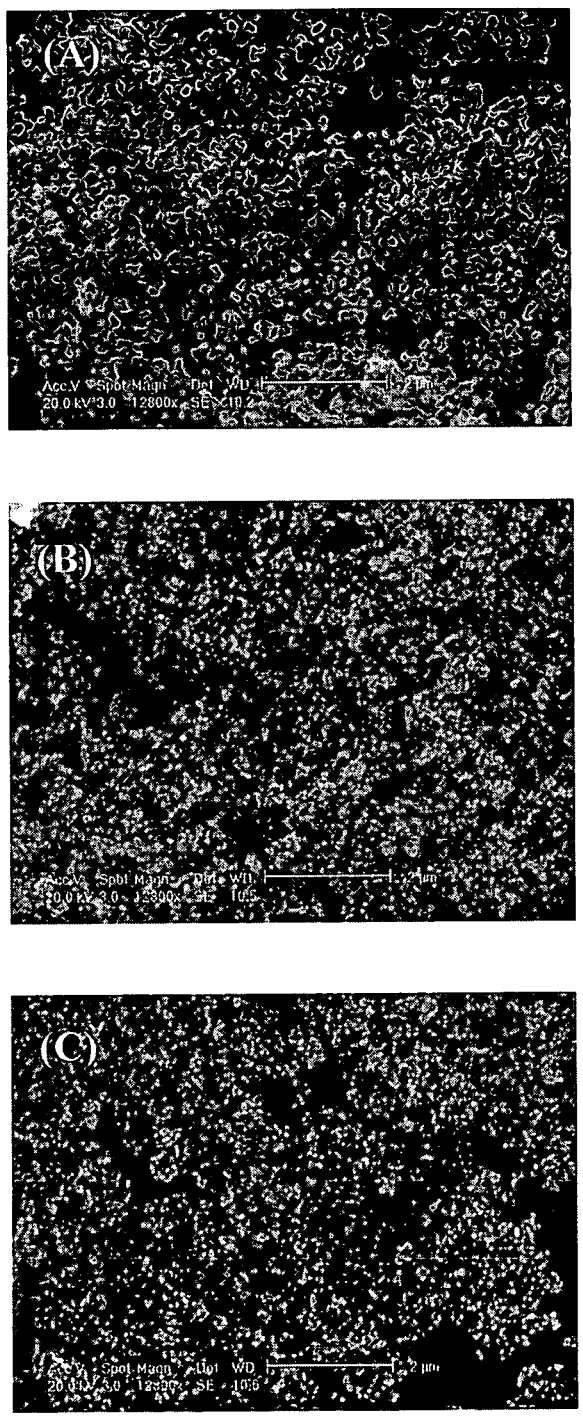
FIG. 15: SEM images of pulse electrodeposited electrode with different duty cycles. (A) 5.2 ms on-time/30 ms off-time (B) 5.2 ms on-time/70 ms off-time (c) 5.2 ms on-time/140 ms off-time.

FIG. 14 shows the polarization curves of the electrodes prepared at different duty cycles. The duty cycle was changed by increasing the off time while the peak current density, on time and total charge density were fixed at 200 $mA/cm^2$, 5.2 ms and 6 $C/cm^2$, respectively. The estimated active surface area and the Pt loadings are summarized in Table 2. The results indicate that the duration of the off time plays an important role in the deposition since the recovery of concentration of the electroactive species on the surface electrode occurs in this period. As shown in FIG. 15-(A), with a decrease of the off time (30 ms), a large increase of the particle size of the deposit is observed. The results can be explained by taking into account that the limiting current density decreases with an increase of the duty cycle (a decrease of the off time). Since the limiting current density is below the applied peak current density (200 $mA/cm^2$), the deposition results in a formation of larger particle sizes. The deposition efficiency also increases with a decrease of the off time because the platinum deposition overpotential on the surface of platinum is lower than that on the carbon surface. When the off time is too long, the limiting current density becomes higher than the applied current density. In this case a longer deposition time is necessary in order to achieve the same platinum loading. This is a similar situation as in the case when a low peak current density is applied to the system. As discussed above, low peak current densities decrease the nucleation rate of the deposit. Thus, the off time should be optimized in order to decrease the catalyst particle size and to increase the MEA performance.

Figure 16:
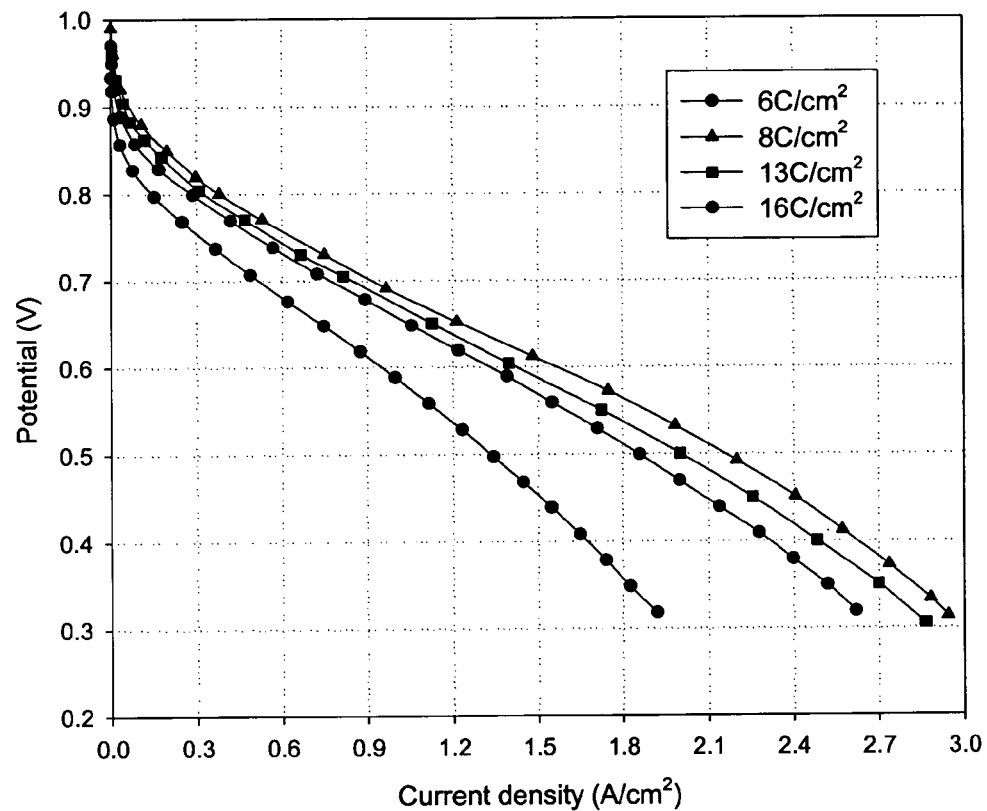
FIG. 16: Effect of charge density on the performance of the PEM fuel cell.

In pulse electrodeposition, by varying the total charge applied for electrodeposition the amount of Pt loading can be controlled. In order to study the effect of this parameter, the total charge density was varied in the range between 6 $C/cm^2$ and 20 $C/cm^2$ while the peak current density and the duty cycle were fixed at 400 $mA/cm^2$ and 2.9% (3 ms on time, 100 ms off time) respectively. The duration of electrodeposition time was between 8.5 and 28.6 min. FIG. 16 shows the polarization curves of the MEAs prepared using different charge densities. As shown in FIG. 16, the MEA performance increases with the increase in the total charge density from 6 to 8 $C/cm^2$. For charges higher than 8 $C/cm^2$, the MEA performance decreases.

Figure 17:
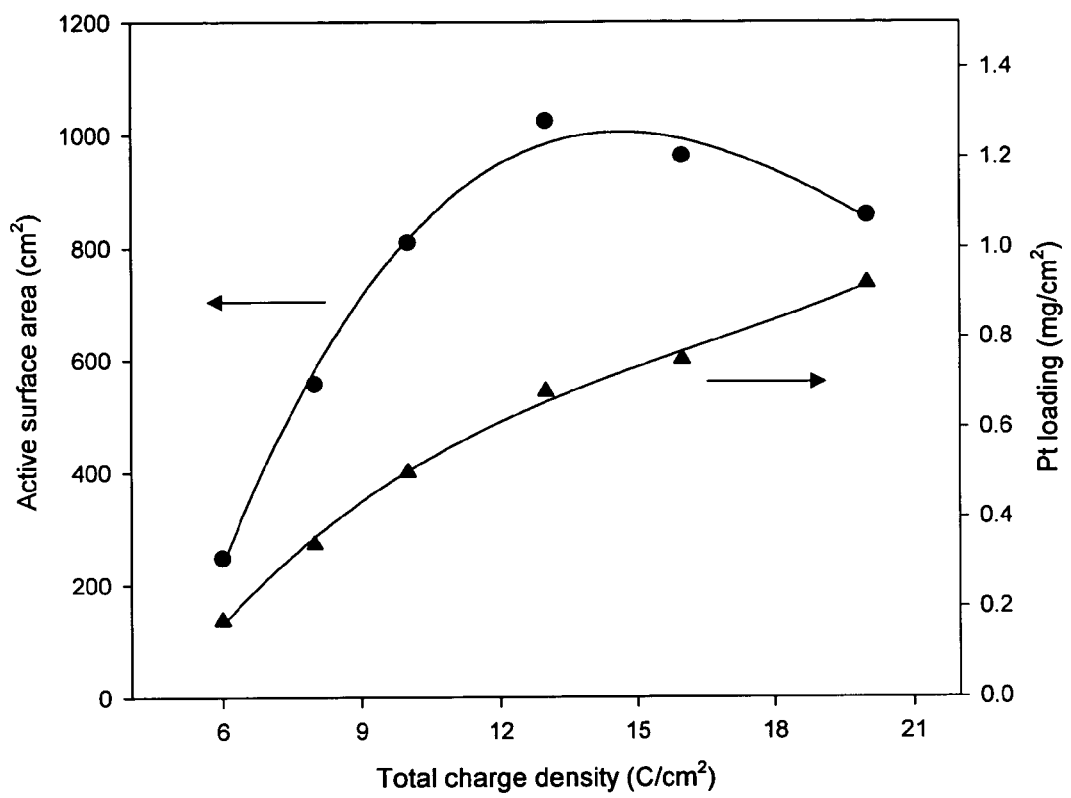
FIG. 17: Effective surface area and Pt loading with respect to the charge density.
Figure 18:
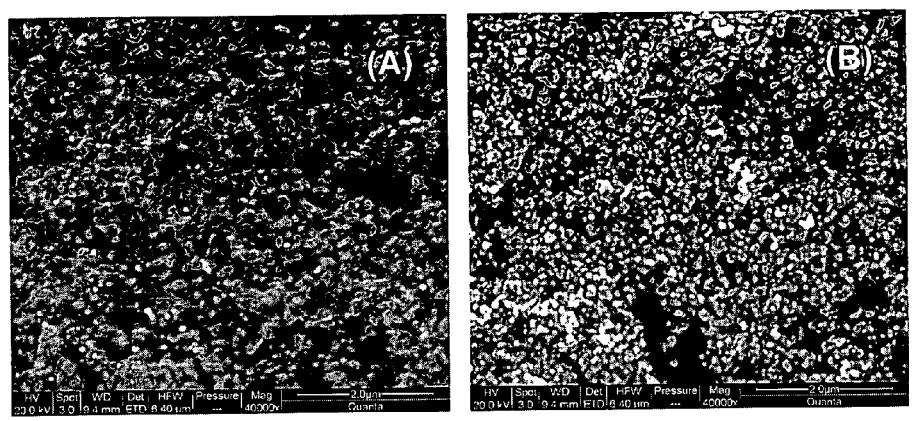
FIG. 18: SEM images of pulse electrodeposited electrode with different charge densities 6 C/cm$^2$, (B) 13 C/cm$^2$.

The effect of charge density on the active surface area of platinum was studied more extensively by using cyclic voltammetry. From the CVs, the active surface area of platinum was estimated for each charge density used to deposit platinum on carbon. The platinum loading was measured using ICP-AES. The effective surface area and Pt loading as a function of charge density are presented in FIG. 17. As shown in this figure, the Pt loading increases from 0.17 $mg/cm^2$ to 0.92 $mg/cm^2$ with the increase in the total charge. These results are in agreement with the SEM images shown in FIG. 18. The white spots in FIG. 18, corresponding to platinum deposit increase in number and cover the entire surface of the carbon electrode when the charge density is increased. The active surface area shows a maximum of approximately 13 $C/cm^2$. The results can be explained by taking into account the fact that the carbon surface area is insufficient to accommodate any new nucleation at high total charge densities, which results in deposition of large particle sizes of the catalyst. The estimated specific active surface decreased from 33 $m^2/g$ to 19 $m^2/g$ when the charge density was increased above 13 $C/cm^2$. The other possible explanation for the observed decrease in MEA performance is the increase of the thickness of the catalyst layer when the Pt loading was increased. When the deposition time increases, the amount of platinum deposited inside the electrode also increases thus increasing the thickness of the catalyst layer.

Figure 19:
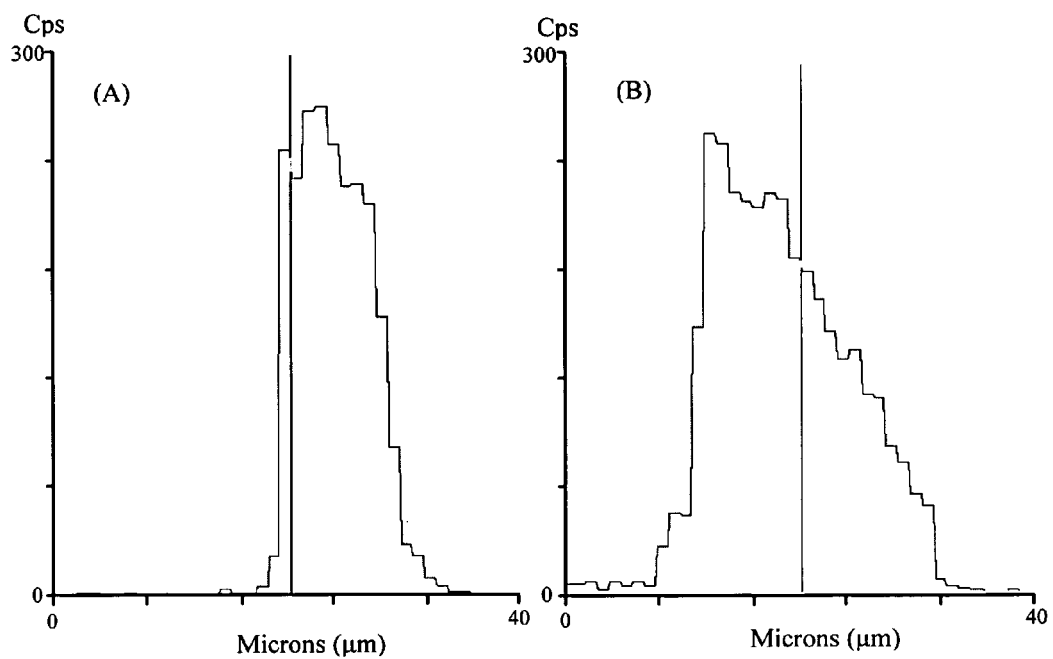
FIG. 19: Comparison of Pt line scan image in the cross section of the MEA between (A) 8 C/cm$^2$ and (B) 20 C/cm$^2$.
Figure 20:
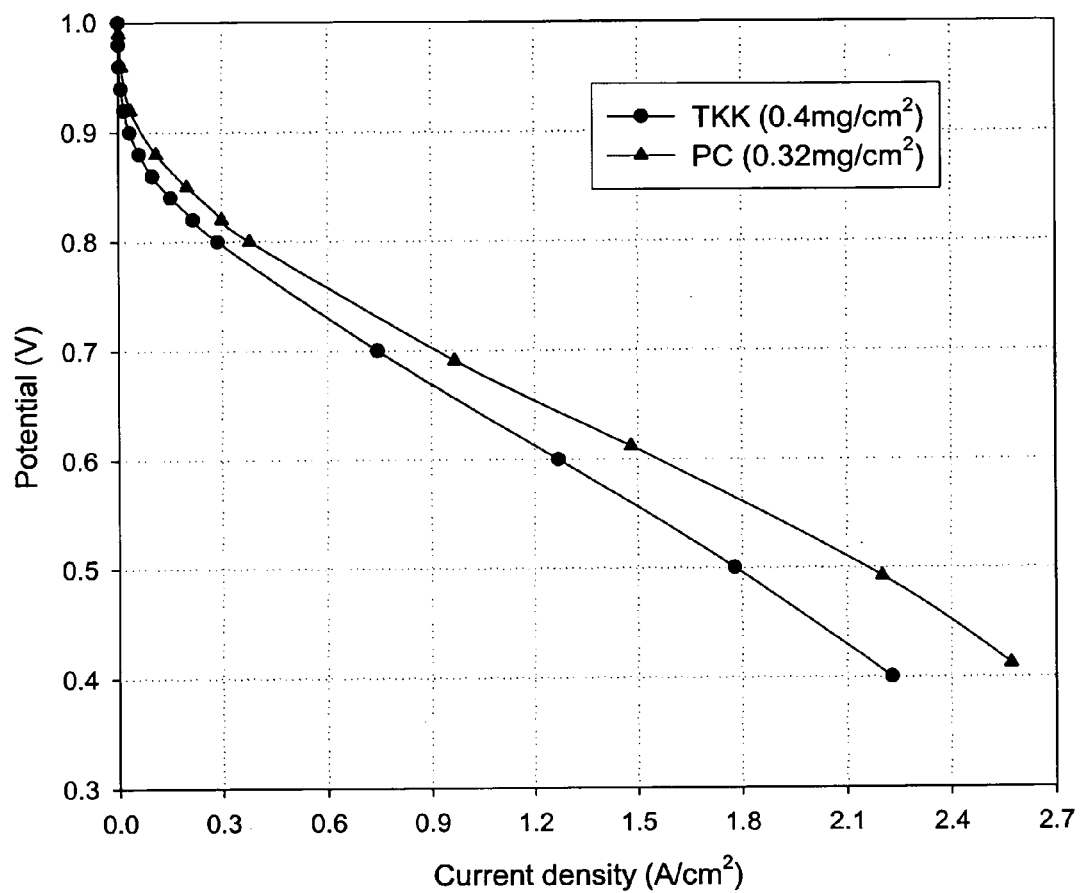
FIG. 20: Comparison of MEA performance between pulse electrodeposited electrode and TK electrode, $H_2/O_2$, 75° C., 1 atm.

Both experimental and modeling studies of membrane electrodes indicate that active layers thicker than 10 μm result in low catalyst utilization due to transport limitations of dissolved oxygen and protons in the ionomer. To estimate the thickness of the catalyst, a Pt line scan in the cross section of MEA was performed using EPMA. FIG. 19 compares the Pt line scan image in the cross section of two MEAs constructed with different Pt loadings, namely 8 $C/cm^2$ and 20 $C/cm^2$. According to this analysis, the Pt content in the catalyst layer in both cases shows the highest level at the surface of electrode and decays with increasing distance from the membrane to the GDL. This is a typical phenomenon observed in the pulse electrodeposition method, since the electrodeposition is controlled by the diffusion of electrolytes in the porous electrode. When comparing the thickness of the catalyst layer, a much thicker layer is detected in the electrode prepared at higher total charge density. FIG. 20 shows the comparison of performance between the pulse electrodeposited electrode and one prepared by using TKK Pt/C powder (46 wt %). The TKK electrode was prepared by spraying a mixture of TKK Pt/C and Nafion solution onto the E-TEK gas diffusion layer. The Pt loading of TKK electrode was 0.4 $mg/cm^2$. The result indicated that the pulse electrodeposited electrode has higher current densities at a given potential under the same operating conditions with less amount of Pt loading of 0.32 mg/cm².

CONCLUSION

The pulse electrodeposition technique has been developed as a new method of fabricating MEA. By localizing platinum on the surface of a blank carbon electrode, it is possible to decrease the thickness of the catalyst layer and increase the efficiency of platinum usage. By increasing the peak current density, the particle size of platinum was decreased and the performance of MEA increased.

The results indicate that the duration of the pulse off time plays an important role in the deposition. When the off time is too long, a longer deposition time is required to achieve the same platinum loading, while the overall overpotential of the platinum reduction decreases due to a decrease in the mass transfer overpotential. Consequently, a longer off time results in a decrease in the nucleation rate. By varying the total charge applied for electrodeposition, the amount of Pt loading in the catalyst layer can be controlled. Any increase in charge density beyond 8 C/cm² increases the Pt loading and the thickness of the catalyst layer without increasing the catalyst efficiency. MEA performance strongly depends on the pulse plating deposition parameter, which can be optimized following the guidelines outlined in this paper.

TABLE 1

Summary of Effective Surface Area and Pt wt % Estimated for Different Deposition Conditions.*

| Peak current density | On time (ms) | Off time (ms) | Duty cycle (%) | Effective surface area (cm²) | Pt wt % |
|---|---|---|---|---|---|
| 10 mA/cm² DC | — | — | — | 223 | 40 |
| 30 mA/cm² PC | 34.7 | 73.3 | 32.1 | 252 | 36 |
| 100 mA/cm² PC | 10.4 | 97.6 | 9.6 | 380 | 46 |
| 200 mA/cm² PC | 5.2 | 102.8 | 4.8 | 423 | 52 |
| 400 mA/cm² PC | 2.6 | 105.4 | 2.4 | 319 | 55 |
| 600 mA/cm² PC | 1.7 | 106.3 | 1.6 | 85 | 26 |

*Total Charge density is fixed at 6C/cm².

TABLE 2

Effective Surface Area and Pt Loading Estimated for Different Duty Cycles

| Off time (ms) | Peak current density (mA/cm²) | On time (ms) | Duty cycle (%) | Effective surface area (cm²) | Pt loading (mg/cm²) |
|---|---|---|---|---|---|
| 30 | 200 | 5.2 | 14.7 | 161 | 0.68 |
| 70 | 200 | 5.2 | 6.9 | 338 | 0.24 |
| 140 | 200 | 5.2 | 3.5 | 157 | 0.15 |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only and is not intended to limit the invention so further described in such appended claims.

What is claimed is:

1. A method of making a polymer electrolyte membrane fuel cell comprising the steps of:
   contacting an uncatalyzed carbon electrode having a surface area with an electrodeposition solution containing ions of a catalytic metal, the uncatalyzed carbon electrode including a hydrophobic layer comprising carbon and a hydrophilic layer comprising carbon;
   applying a pulse current to said electrodeposition solution to deposit said catalytic metal on said surface area of said carbon electrode thereby forming a catalyst layer; and
   heat treating said catalyzed carbon electrode.

2. A method of making a polymer electrolyte membrane fuel cell as defined in claim 1, wherein the step of contacting comprises contacting said uncatalyzed carbon electrode with an electrodeposition solution containing Pt ions.

3. A method of making a polymer electrolyte membrane fuel cell as defined in claim 1, wherein said catalyst layer has a thickness of less than 12 µm.

4. A method of making a polymer electrolyte membrane fuel cell as defined in claim 1, wherein said catalyst layer has a thickness of less than 8 µm.

5. A method of making a polymer electrolyte membrane fuel cell as defined in claim 1, wherein said catalyst layer has a thickness of less than 4 µm.

6. A method of making a polymer electrolyte membrane fuel cell as defined in claim 1, wherein the ratio of catalytic metal to carbon of said catalyst layer is at least 25 wt. % within less than 6 µm of said surface area.

7. A method of making a polymer electrolyte membrane fuel cell as defined in claim 1, wherein the ratio of catalytic metal to carbon of said catalyst layer is at least 50 wt. % within less than 4 µm of said surface area.

8. A method of making a polymer electrolyte membrane fuel cell as defined in claim 1, wherein the ratio of catalytic metal to carbon of said catalyst layer is at least 75 wt. % within less than 2 µm of said surface area.

9. A method of making a polymer electrolyte membrane fuel cell as defined in claim 1, wherein the pulse current density is from about 20 mA/cm2 to about 600 mA/cm2.

* * * * *